United States Patent [19]

Käferböck et al.

[11] Patent Number: 4,754,939

[45] Date of Patent: Jul. 5, 1988

[54] ONE WAY DRIVE SYSTEM FOR A RECORDING AND/OR PLAYBACK MACHINE WITHOUT FREE-WHEELING DRAG

[75] Inventors: Johannes Käferböck, Vienna; Winfried Schafler, Korneuburg, both of Austria

[73] Assignee: U.S. Philips Corp., New York, N.Y.

[21] Appl. No.: 924,641

[22] Filed: Oct. 29, 1986

[30] Foreign Application Priority Data

Nov. 8, 1985 [AT] Austria .......................... A3244/85

[51] Int. Cl.⁴ ............................................ G11B 15/32
[52] U.S. Cl. ........................................ 242/201; 192/45
[58] Field of Search .......................... 242/200–204, 242/67.4; 192/12 B, 45, 48.92

[56] References Cited

U.S. PATENT DOCUMENTS

| | | | |
|---|---|---|---|
| 2,391,350 | 12/1945 | Schmidt | 192/45 |
| 2,393,693 | 1/1946 | Kelbel | 192/45 |
| 3,055,471 | 9/1962 | Warn et al. | 192/12 B X |
| 3,495,789 | 2/1970 | Gerfast | 242/201 |
| 3,684,212 | 8/1972 | Engert | 242/201 |
| 4,346,859 | 8/1982 | Osanai | 242/201 |
| 4,391,416 | 7/1983 | Osanai | 242/200 X |
| 4,512,535 | 4/1985 | Dickson et al. | 242/201 X |

FOREIGN PATENT DOCUMENTS 1193263  2/1966  Fed. Rep. of Germany.

Primary Examiner—John M. Jillions
Attorney, Agent, or Firm—David R. Treacy

[57] ABSTRACT

A one-way over-running clutch has drive rollers captured in tapering spaces between the driving and driven member, and a cage for guiding the rollers in the direction of tapering. To allow the driven member to be completely free wheeling in both directions when the driving member is stationary, the cage is connected to a mechanism which permits cage movement in when the driving direction. In a drive system for a winding core in a tape recording and/or playback machine, the one-way mechanism for controlling cage rotation includes a second set of rollers captured between a fixed circular cylindrical surface and inclined surface formed on the cage unit.

7 Claims, 1 Drawing Sheet

ONE WAY DRIVE SYSTEM FOR A RECORDING AND/OR PLAYBACK MACHINE WITHOUT FREE-WHEELING DRAG

BACKGROUND OF THE INVENTION

The invention relates to a drive system for a driven member such as a drive shaft or hub of a recording and/or playback machine for a recording medium in the form of a tape, which is connected to at least one winding core which can be placed upon the drive shaft. Between a driving member such as a disc drivable by a motor and the drive shaft or hub, there is a one-way or slipping clutch which has a roller system guided in a cage. The rollers each operate on one side with an inclined surface and on the other with a cylindrical surface opposite the inclined surface. The one side of the roller system is connected to a drive disc and the other to the drive shaft. The rollers operate as a coupling between the disc and shaft when the drive disc rotates in a direction in which the drive hub is driven to wind the tape on the winding core.

Such a drive is known from German Auslegeschrift 11 93 263, in which the clutch fitted between the drive disc and the drive shaft is to be without reaction when free-wheeling so that it does not hinder the running of the tape. To accomplish this, it is proposed that a brake act on the cage guiding the roller system of the clutch. Such a brake acting continuously on the cage has the drawback, however, that the cage is also braked when power is to be transmitted from the drive disc to the drive shaft; i.e., when, in the appropriate direction of rotation of the drive disc, the drive shaft is driven to wind the tape on the winding core, thus additionally loading the drive system.

SUMMARY OF THE INVENTION

It is the aim of the invention to construct such a one-way drive that, with the clutch free-wheeling, there is a complete absence of reaction without imposing any additional load on the drive when, in the appropriate direction of rotation of the driving member, it transmits the force therefrom to the driven member.

According to the invention a second one-way mechanism, or brake, also with a roller system, is arranged coaxially with the first, acting between the cage guiding the roller system of the clutch and a stationary disc. The rollers of the system of this second mechanism operate together with an inclined surface on one side and a cylindrical surface on the other. These opposite surfaces are provided on one side on the cage guiding the roller system of the clutch and on the other on the stationary disc, and the rollers between them operate as a brake or lock when the driving member is stationary and the driven member turns in the direction opposite to that in which the tape is wound on the winding core. In this manner the cage guiding the roller system of the clutch is braked and held only when the driven member turns in the direction opposite to that for winding the tape on the winding core, i.e. in the direction in which the tape is wound off the core.

The freewheel of the clutch fitted between the driving member and the driven member thus becomes properly effective, because the second mechanism couples the stationary disc and the cage guiding the roller system of the clutch so that the latter is braked and held, resulting, in this operating situation, even in the worst case, in the keeping of the rollers of the clutch roller system out of engagement with its inclined surfaces. The second one-way mechanism, however, is free-wheeling when the driving member is rotating in its drive direction in which the clutch transmits the force to the driven member to wind the tape on the winding core, so that the cage guiding the roller system of the clutch can run completely freely. In that case there is no coupling with the stationary disc and therefore no additional load on the drive.

BRIEF DESCRIPTION OF THE DRAWING

The invention will be described in greater detail with reference to the drawings, which represent a non-limitative embodiment of the invention.

DESCRIPTION OF THE PREFERRED EMBODIMENT

Figure 1:
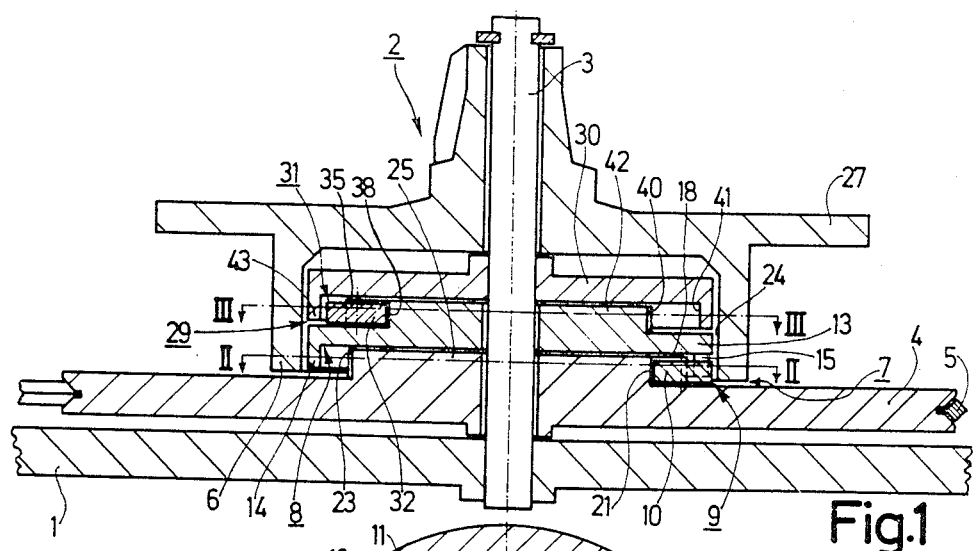
FIG. 1 is a cross-section through the drive shaft or hub of a system in accordance with the invention, having a one-way mechanism braking the cage of a one-way roller drive clutch.

In FIG. 1, 1 denotes the chassis of a tape recorder. Each end of the tape is conventionally attached to a winding core in a cassette, on which the tape may be wound on or off. The tape is driven by driving systems allocated to both cores. Each system has a drive shaft or hub on which the core may be fitted over a coupling such as one formed by ribs on the drive hub engaging in corresponding slots in the core. When a drive hub is driven in one direction of rotation, the appropriate core is also driven to wind the tape on it, while the tape is wound off the other core.

Figure 2:
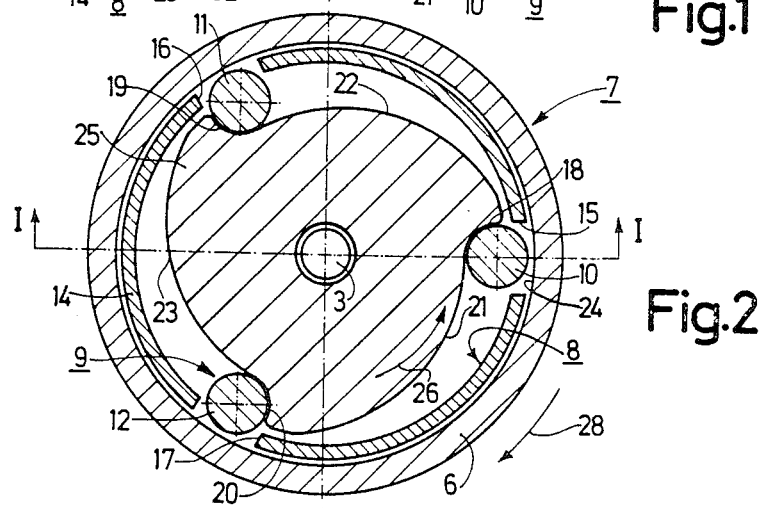
FIG. 2 is a section along the line II—II in FIG. 1 taken through the clutch.

FIG. 1 shows such a drive, with 2 denoting its hub. This drive shaft 2 can rotate freely on a spindle 3 which is permanently secured to chassis 1. Spindle 3 is also fitted with a freely rotatable drive disc 4 which may be driven by a motor, via a belt 5. Power may be transmitted from drive disc 4 to hub 2 by a clutch 7 operating between the driving disc and a collar 6 which is part of the hub 2, and surrounds the clutch parts. The clutch 7 is, itself, of conventional construction as shown in section in FIG. 2.

Clutch 7 has a roller system 9 guided by a cage unit 8, and having three rollers 10, 11, and 12 arranged in a mutually angularly staggered array. Balls may also be used instead of rollers, in the known manner. Cage unit 8 consists of disc 13, arranged to rotate freely on spindle 3; a peripheral, annular, projecting tubular cage portion 14 provided with three recesses 15, 16 and 17, into which rollers 10, 11 and 12 are inserted and a boss 42 having braking cam surfaces 38–40 for the second one-way mechanism. Each of these rollers 10, 11 and 12 operates between an inclined cam surface 21, 22 and 23 terminating in a shoulder 18, 19 and 20 for the appropriate roller, and a cylindrical surface 24 common to all the rollers. In this embodiment, inclined surfaces 21, 22 and 23 are provided at the peripheral surface of a boss 25 projecting axially from drive disc 4 into the collar 6. Opposite these inclined surfaces 21, 22 and 23 the cylindrical surface 24 is formed by the inner wall of collar 6 of hub 2. Between these inclined surfaces 21, 22 and 23 and cylindrical surface 24 the cage portion 14 of cage unit 8 guides rollers 10, 11 and 12 about the periphery of the boss 25. Together with their shoulders 18, 19 and 20, inclined surfaces 21, 22 and 23 are directed in such a way for rollers 10, 11 and 12 that, in relation to cylindrical surface 24, these surfaces form slots narrowing away from shoulders 18, 19 and 20 in a clockwise direction.

If drive disc 4 is rotated counterclockwise in the direction of arrow 26, inclined cam surfaces 21, 22 and 23 clamp rollers 10, 11 and 12 between them and the cylindrical surface 24, creating a coupling between these surfaces and thus transmitting power from drive disc 4 to hub 2, which then also rotates anticlockwise, so that a winding core fitted on it is driven to take up the tape on it.

If, on the other hand, the hub 2 is itself directly driven counterclockwise, rollers 10, 11 and 12 would remain against shoulders 18, 19 and 20 of inclined surfaces 21, 22 and 23 at the widest part of the slots between the inclined and cylindrical surfaces, so that the rollers would not be clamped between these surfaces. Thus here, too, there would be no coupling between drive shaft 2 and drive disc 4, since clutch 7 would again be free-wheeling and there would be no effect on the direct drive for the hub. With such a direct drive hub it is possible, for example, to wind the tape quickly on the core fitted on the hub. To this end, for instance, a disc-shaped flange 27 fitted on drive shaft 2 may take the form of a toothed wheel engaging with a drive cog, or a drive wheel may be directly engaged with flange 27.

If a core is placed on hub 2 and a tape has been wound thereon by the above-described drive system, and if the tape is wound off the core again by pulling, hub 2 is caused to rotate clockwise, in the direction of arrow 28. Hub 2 should then not be coupled to drive disc 4, since such coupling could impair operation of the recorder. Clutch 7 would, per se, produce no such coupling if its rollers 10, 11 and 12, are bearing on shoulders 18, 19 and 20, at the widest parts of the slots between inclined surfaces 21, 22 and 23 and cylindrical surface 24, since the rollers would theoretically not be moved by cylindrical surface 24 with hub 2 rotating clockwise. In practice, however, this is not necessarily so, for only a slight misalignment even of only one roller can cause it to rotate with cylindrical surface 24, thus causing the roller concerned, together with cage portion 14, to shift in the direction of the narrowing slot, resulting in that roller's being clamped between the appropriate inclined and cylindrical surfaces. The other rollers, too, would then be taken into the clamped position by the cage portion 14, and there would then be an undesired coupling between drive shaft 2 and drive disc 4. To prevent such an undesirable reaction, it is already known to retard the cage of such a one-way clutch by a brake acting on it so that the cage is forced to keep the rollers at the widest parts of the slots between the inclined and cylindrical surfaces and thus safeguard the free-wheeling of the clutch in these operational conditions as well. Such cage braking produces friction which counteracts the driving force of the part of the clutch which would try to engage. This has the drawback, however, that the braking force is also effective when the slipping clutch is intended to transmit power and therfore additionally loads the drive system.

Figure 3:
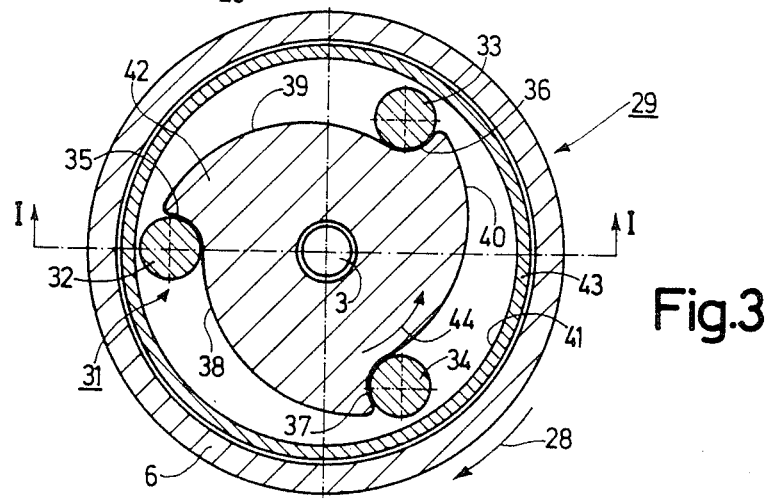
FIG. 3 is a section along line III—III in FIG. 1 taken through the second one-way mechanism.

To remedy this, in accordance with the invention a second one-way mechanism 29 is fitted coaxially with clutch 7 already described, to act as a one-way brake between the cage portion 14 which guides the roller system 9 of the first clutch 7 and a stationary disc 30. The disc 30 is placed beside cage unit 8 and secured on the fixed spindle 3 inside collar 6 of hub 2. This second one-way mechanism 29, shown in section in FIG. 3, also has a roller system 31 having three rollers 32, 33 and 34 in mutually angularly spaced array, not guided here in a cage for the sake of simplicity. It would, of course, also be possible per se to guide these rollers in a cage. Rollers 32, 33 and 34 of roller system 31 of this second mechanism 29 again each operate between an inclined surface 38, 39 and 40, fitted with a shoulder 35, 36 and 37 for the appropriate roller, and a cylindrical surface 41 shared by all the rollers. These opposite surfaces are provided on one side on cage unit 8 of the clutch, and on the other on stationary disc 30.

In this embodiment, surfaces 38, 39 and 40 are provided at the periphery of the boss 42 projecting axially from disc 13 of cage unit 8, and cylindrical surface 41 is formed by the inner wall of a sleeve 43 projecting from stationary disc 30. Together with their shoulders 35, 36 and 37 for rollers 32, 33 and 34, surfaces 38, 39 and 40 are oriented so that, in relation to the cylindrical surface 41, they form slots narrowing counterclockwise away from shoulders 35, 36 and 37.

If, via clutch 7, power is transmitted from drive disc 4 to hub 2, with, as described above, drive disc 4 rotating counterclockwise cage unit 8 also rotates counterclockwise in the direction of arrow 44. In the second one-way mechanism 29 inclined surfaces 38, 39 and 40 on boss 42 of cage 8 hold rollers 32, 33 and 34 against the shoulders 35, 36 and 37 at the widest points of the slots between the inclined surfaces and cylindrical surface 41, so that this second mechanism 29 is free-wheeling and there is no operative connection between cage unit 8 and stationary disc 30. Thus power is smoothly transferred from drive disc 4 to hub 2 through the clutch 7 without any additional load.

If, however, hub 2 rotates clockwise, in the direction of arrow 28, as when a tape winding core placed upon it unwinds the tape, and rollers 10, 11 and 12 of the first one-way mechanism or clutch 7 also attempt to take their cage portion 14 clockwise through undesirable cooperation with cylindrical surface 24 on collar 6 of hub 2, the same attempted rotation is applied to boss 42 on cage unit 8 and its inclined surfaces 38, 39 and 40; but this means that rollers 32, 33 and 34 of the second one-way mechanism or brake 29 are clamped between inclined surfaces 38, 39 and 40 and cylindrical surface 41 on stationary sleeve 43 of disc 30, so that cage unit 8 of the clutch 7 cannot rotate further, since it is braked and held by stationary disc 30 via the brake 29. As already explained, this ensures that in this instance the clutch 7 is actually free-wheeling and there can be no reaction from hub 2 on drive disc 4 and vice versa. Thus proper operation of the drive system is ensured in all operating conditions.

Of course, it would be possible to make a number of modifications to the embodiment described above without departing from the scope of the invention. Inclined surfaces 21, 22 and 23 of the clutch 7 could, for example, also be provided on the inner wall of an annular sleeve projecting from drive disc 4 and engaging collar 6 of hub 2, an arrangement which could similarly apply to inclined surfaces 38, 39 and 40 of the brake 29, which could then be provided on the inner wall of an annular insert projecting from disc 13 of cage unit 8 and engaging stationary disc 30.

What is claimed is:

1. A drive system for an apparatus having a driving member and a driven member, comprising a one-way over-running clutch responsive to movement of said driving member in a driving direction for driving said driven member in said driving direction, and means for decoupling the driven member from the driving member when the driving member is stationary, said clutch comprising a cam surface connected to one of said members, an opposed surface connected to the other of said members, a roller disposed between said surfaces, and a cage for guiding said roller for movement in a direction of relative movement between said members parallel to said driving direction; said surfaces defining a space therebetween narrowing in said driving direction, and said cage being part of said means, characterized in that said means includes means for permitting movement of said cage in said direction of driving movement only.

2. A system as claimed in claim 1, characterized in that said means for permitting comprises two opposed cage-braking surfaces defining a space therebetween narrowing in a direction opposite said driving direction, and a cage-braking roller disposed between said cage-braking surfaces, one of said cage-braking surfaces being connected to said cage and the other of said cage-braking surfaces being fixed.

3. A system as claimed in claim 2, characterized in that said driving direction is a direction of rotation about an axis, and said opposed surface and one of said cage-braking surfaces are circular cylindrical surfaces coaxial with said axis.

4. A system as claimed in claim 3, characterized in that the other of said cage-braking surfaces is an inclined surface formed on an element which includes said cage.

5. A system as claimed in claim 1, characterized in that means for permitting comprises first and second opposed cage-braking surfaces defining a space therebetween narrowing in a direction opposite said driving direction, and a cage-braking roller disposed between said cage-braking surfaces; said first surface being a circular cylindrical surface coaxial with said axis, and said second surface being inclined with respect to said first surface; and one of said cage-braking surfaces being connected to said cage and the other of said cage-braking surfaces being fixed.

6. A system as claimed in claim 5, characterized in that said machine includes a fixed spindle extending from a chassis, said driven member is a hub rotatably mounted on said spindle, and said driving member is a drive disc rotatably mounted on said spindle, characterized in that said circular cylindrical surface formed on the other of said members is an inner surface of a collar extending from said hub toward said chassis, said cam surface is formed on a boss extending from said disc toward said hub, and said cage is part of a cage unit, said second surface being formed on said cage unit; and said first surface is formed on an element fixed to said spindle and disposed between said drive disc and said hub, surrounded by said collar.

7. A drive system for a recording and/or playback machine for a recording medium formed as a tape wound onto a winding core, having a driving member and a driven member, said driven member being arranged to engage the winding core for rotating it about an axis, comprising:

a one-way over-running clutch responsive to rotation of said driving member in a driving direction for rotating said driven member in said driving direction, and means for decoupling the driven member from the driving member when the driving member is stationary, said clutch comprising a cam surface connected to one of said members, an opposed circular cylindrical surface formed on the other of said members coaxially with said axis, a roller disposed between said surfaces, and a cage for guiding said roller for movement around said axis between said members in said driving direction; said surfaces defining a space therebetween narrowing in said driving direction, and said cage being part of said means, characterized in that said means includes means for permitting movement of said cage in said direction of driving movement only.

* * * * *

UNITED STATES PATENT AND TRADEMARK OFFICE
CERTIFICATE OF CORRECTION

PATENT NO. : 4,754,939
DATED : July 5, 1988
INVENTOR(S) : JOHANNES KAFERBOCK ET AL It is certified that error appears in the above-identified patent and that said Letters Patent is hereby corrected as shown below:

Claim 5, line 1: Change "claim 1" to -- claim 7 --

Claim 5, line 2: After "that" insert -- said --

Signed and Sealed this

Seventh Day of March, 1989

Attest:

DONALD J. QUIGG

Attesting Officer

Commissioner of Patents and Trademarks